(No Model.)

N. SCHENKEL.
COUNTERSINK.

No. 323,448.　　　　　　　　　Patented Aug. 4, 1885.

Witnesses.
Harry L. Gill
W. B. Corwin

Inventor.
Nicholas Schenkel
by his Attorneys
Bakewell & Kerr

UNITED STATES PATENT OFFICE.

NICKOLAS SCHENKEL, OF ALLEGHENY CITY, PENNSYLVANIA.

COUNTERSINK.

SPECIFICATION forming part of Letters Patent No. 323,448, dated August 4, 1885.

Application filed June 8, 1885. (No model.)

*To all whom it may concern:*

Be it known that I, NICKOLAS SCHENKEL, of Allegheny City, in the county of Allegheny and State of Pennsylvania, have invented a new and useful Improvement in Countersinks; and I do hereby declare the following to be a full, clear, and exact description thereof, reference being had to the accompanying drawings, forming a part of this specification, in which—

Figure 1:
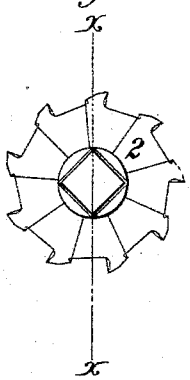
Figure 2:
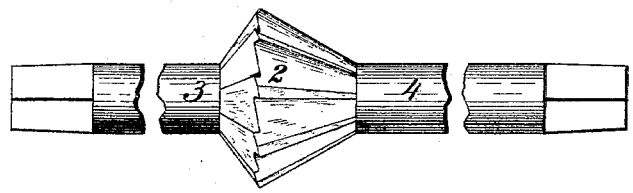
Figure 3:
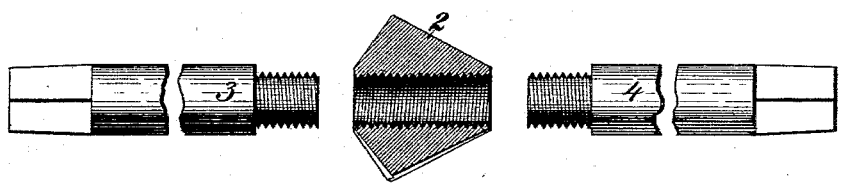
Figure 4:
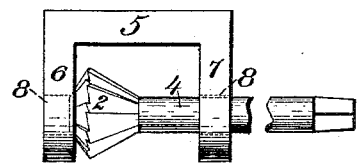

Figure 1 is a plan view of my improved tool. Fig. 2 is a side view of the same. Fig. 3 is a longitudinal axial section on the line $x$ $x$ of Fig. 2. Fig. 4 is a view of the tool when in the operation of boring.

Like letters of reference indicate like parts.

My invention relates to an improvement in countersinks or tools for boring concave holes, and has for its object to provide a tool fit for boring in angles and other places difficult of access.

The tool consists of a cutting-head, 2, which is made, preferably, in shape of a double truncated cone, each side of which is provided with cutting-teeth, the angle of one cone being larger than that of the other. The head 2 is screw-threaded at one or both ends for the reception of a stem or stems, 3 and 4, which are correspondingly provided with male threads.

I have shown in Fig. 4 an ordinary buggy-shackle, 5, for the purpose of illustrating the operation of my improved cutter. Suppose that it is desired to cut a countersunk hole on the inside of the arms 6 and 7 of the shackle at the end of one of the bolt-holes 8: The head 2 is put between the arms with the proper cutting face presented to the place to be countersunk. The stem is inserted through the hole 8 and screwed into the head. The outer end of the stem may then be put into the socket or chuck of a lathe and the countersunk hole easily drilled, whereas unless the head of the tool were thus made detachable it would be almost impossible to do this.

A considerable advantage in the use of my improved tool is, that when used in a lathe, and it is desired to change the tool for any purpose, it will be necessary only to place a new head on the stem without removing the latter from the machine.

The stem may be inserted into either side of the head which may be convenient.

The purpose of having two cutting-faces on the same head is, that the latter may be used to cut upon both sides of it, and the purpose of making these faces of different angles is, that the same tool may be used for cutting holes of various gages.

I do not desire to limit myself to the form of cutting-face herein shown, since

What I claim as my invention is—

1. A countersink having opposite cutting-faces on the same head and a stem or stems detachable therefrom, substantially as and for the purpose described.

2. A countersink having opposite cutting-faces of different gages on the same head and a stem or stems detachable therefrom, substantially as and for the purposes described.

In testimony whereof I have hereunto set my hand this 22d day of May, A. D. 1885.

NICKOLAS SCHENKEL.

Witnesses:
W. B. CORWIN,
THOMAS W. BAKEWELL.